Figure 1:
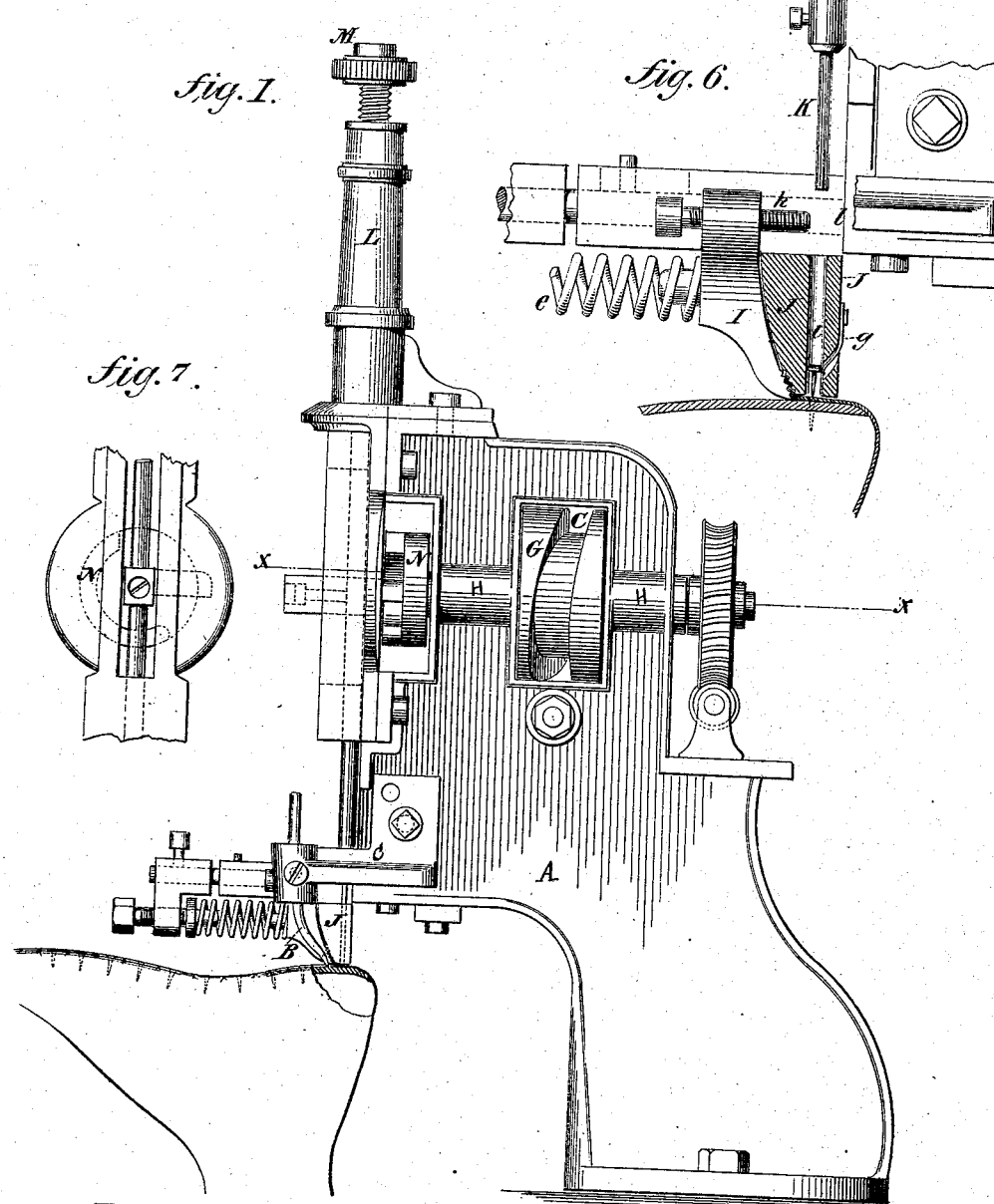

(No Model.)

4 Sheets—Sheet 1.

J. R. SCOTT.
LASTING MACHINE FOR BOOTS AND SHOES.

No. 281,306.

Patented July 17, 1883.

WITNESSES:
Gustave Dieterich
Ja.? Cavanagh

INVENTOR
Jacob R. Scott,
BY J.C. Clayton,
ATTORNEY (No Model.) 4 Sheets—Sheet 2.

J. R. SCOTT.
LASTING MACHINE FOR BOOTS AND SHOES.

No. 281,306. Patented July 17, 1883.

WITNESSES:
Gustave Dieterich
Jas. Cavanagh

INVENTOR
Jacob R. Scott,
BY J. C. Clayton,
ATTORNEY (No Model.) 4 Sheets—Sheet 3.

J. R. SCOTT.
LASTING MACHINE FOR BOOTS AND SHOES.

No. 281,306. Patented July 17, 1883.

WITNESSES:

INVENTOR
Jacob R. Scott,
BY J. E. Clayton,
ATTORNEY (No Model.)

4 Sheets—Sheet 4.

J. R. SCOTT.
LASTING MACHINE FOR BOOTS AND SHOES.

No. 281,306.

Patented July 17, 1883.

WITNESSES:

INVENTOR
Jacob R. Scott,
BY J. C. Clayton,
ATTORNEY

UNITED STATES PATENT OFFICE.

JACOB R. SCOTT, OF NYACK, NEW YORK.

LASTING-MACHINE FOR BOOTS AND SHOES.

SPECIFICATION forming part of Letters Patent No. 281,306, dated July 17, 1883.

Application filed January 4, 1883. (No model.)

*To all whom it may concern:*

Be it known that I, JACOB R. SCOTT, of Nyack, New York, have invented certain new and useful Improvements and Inventions in Lasters or Machines for Lasting Shoes, of which the following is a specification.

Although machines have been heretofore used for lasting shoes, yet by far the larger number of shoes are still lasted by hand. Hand-lasting is slow, requires skilled labor, and is one of the greatest elements of cost in making a shoe. Ordinarily from seven to ten hand-lasters are required to supply each Scott or McKay shoe-sewing machine. It is believed that my invention will work as fast as from seven to ten hand-lasters.

My machine consists of a frame or head supporting a mechanism operated by cams, cranks, rods, and springs, in such a manner that the grippers (one of which rests on the inner sole under the edge of the upper) seize the upper and draw it over the last and hold it there until the driver drives a tack supplied through the track-chute. The grippers are then retracted, and are ready to take a new grip and repeat, as above. The resistance to the drawing-over action of the grippers is due to the action of a finger or holdfast, with a sharp (or a serrated) end, against which the operator presses the inner sole at the instant the grippers make a "grip." As each tack is driven the operator feeds the shoe the proper distance—say one-fourth to three-fourths of an inch—pressing it so as to be securely held by the "holdfast" during the act of drawing over and of driving. This operation closely resembles hand-lasting, but is far more rapid. The details of the construction and operation here follow.

In the drawings similar characters refer to like parts.

Figure 2:
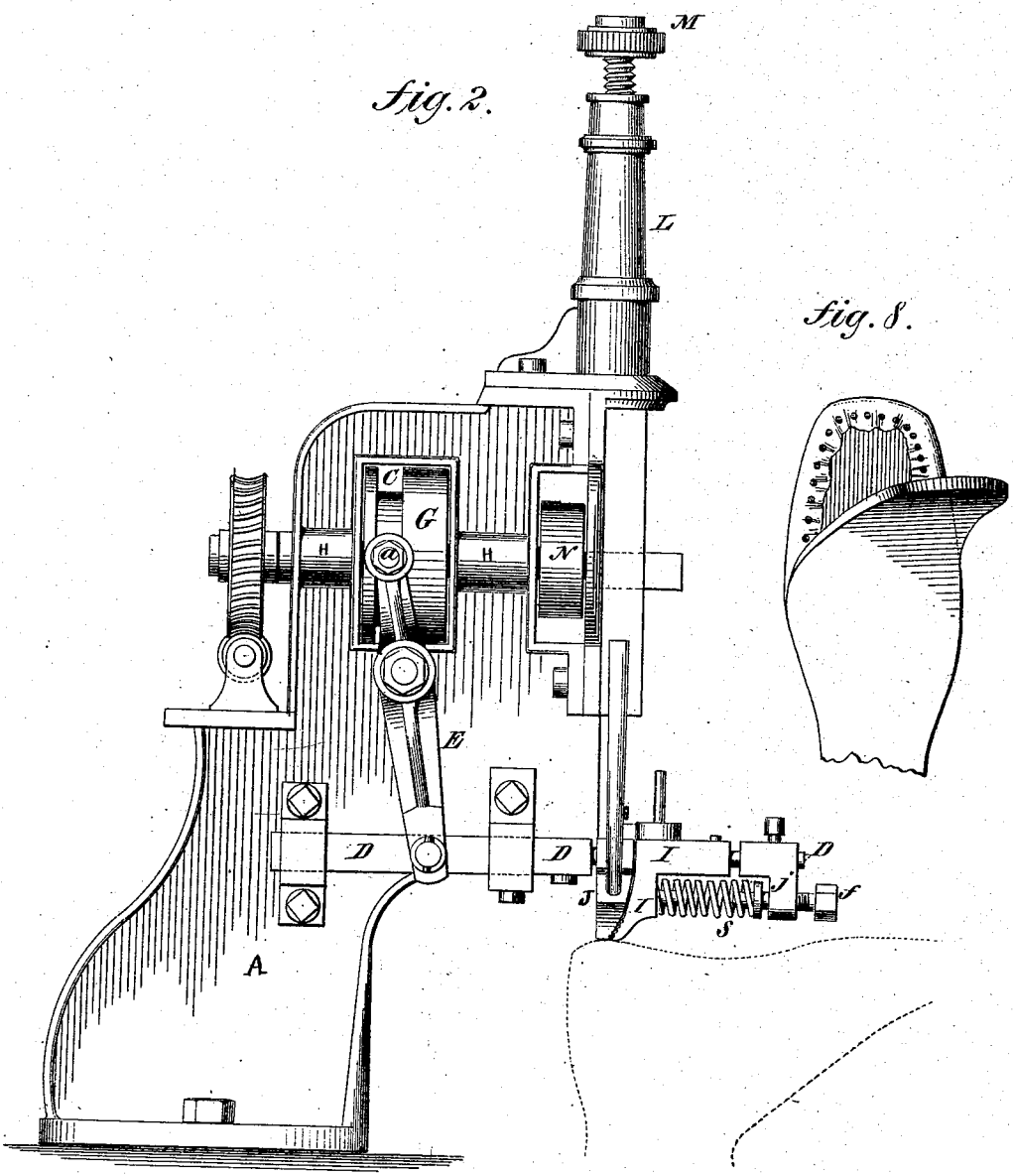
Figure 3:
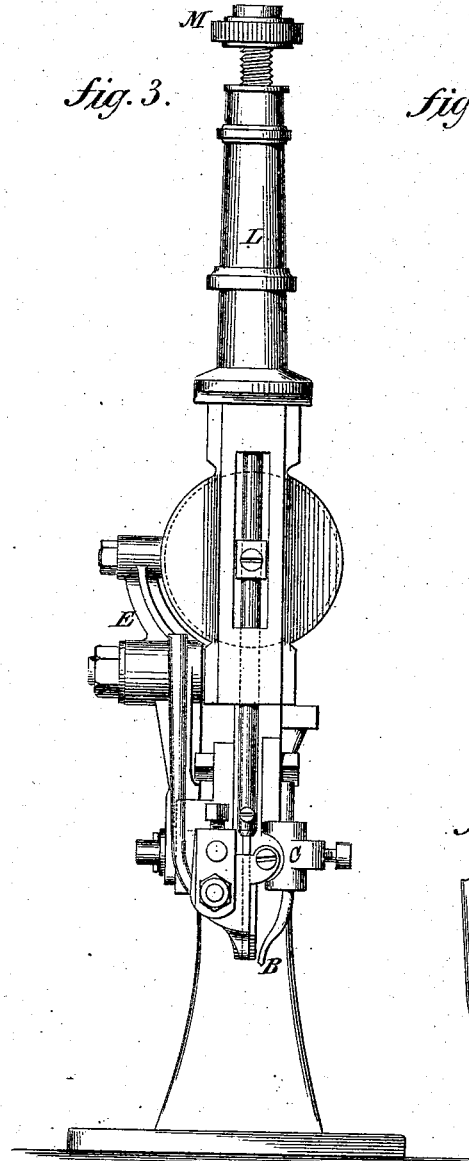
Figure 4:
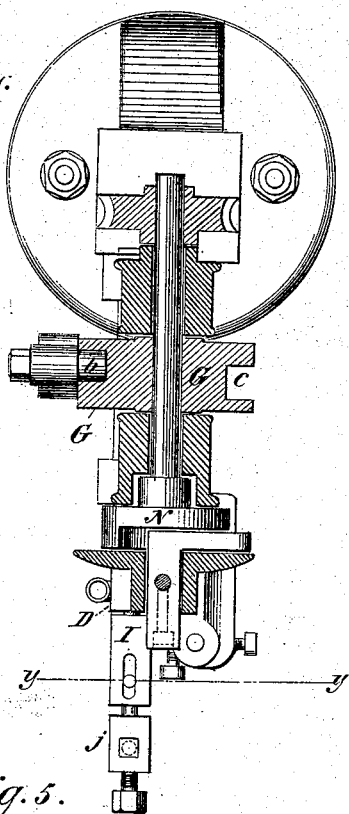
Figure 5:
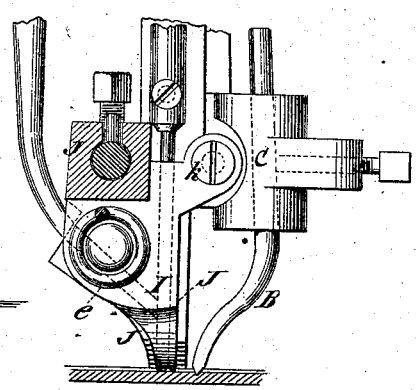
Figure 9:
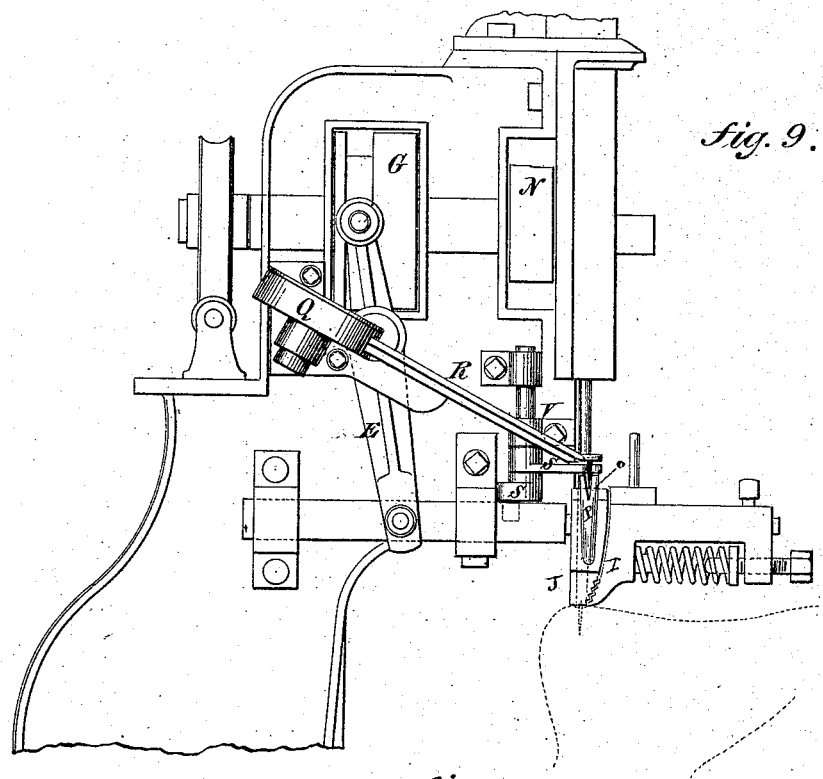
Figure 10:
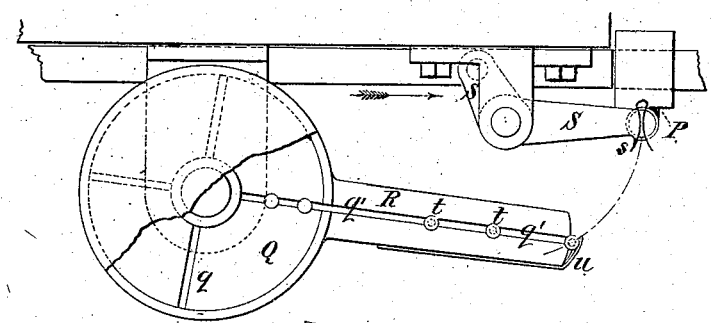
Figure 11:
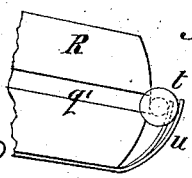

Figure 1 is a side elevation, showing the holdfast set into the insole and the grippers holding the upper drawn over and the tack just driven by the driver. Fig. 2 is a similar elevation of the same from the opposite side of Fig. 1. Fig. 3 is a front elevation of the same. Fig. 4 is a cross-section through the line $x\ x$ of Fig. 1. Fig. 5 is a cross-section through line $y\ y$ of Fig. 4. Fig. 6 is an enlarged detail view, showing the passage of the tack through one of the gripper-jaws. Fig. 7 is a detail view showing operation of the cam which raises the driver. Fig. 8 is a detail showing the upper as it appears when "lasted" to the inner sole, with their position relatively to the outer sole. Fig. 9 is a side elevation like Fig. 2, but with the attachment of an automatic tack-feeder. Figs. 10 and 11 are detail views showing the operation of the tack-feeder. Instead of using this automatic feeder, I may have a boy to feed the tacks by hand into the tack-chute as needed by the operator.

A is the cast head or frame of the machine, which may be cast in one piece, about, say, eighteen inches, and be set fast upon a table or standard.

B is the finger or holdfast, adjustable in arm C, which is secured to the frame. This holdfast B is the most important feature of my invention. It is pointed, serrated, or roughened at the end, so as to take a firm hold against the outer surface of the inner sole when the operator presses the inner sole against the holdfast, at the instant or just before the grippers start to draw the upper over the inner sole and edge of the last. The holdfast B thus steadily holds in a fixed position the last and its inner sole while the upper is being drawn over by the grippers. The construction of this holdfast, which I have described, is simple and effective; but its construction may be varied without changing its principle of operation. For instance, a series of holdfasts arranged radially like a spur-wheel may be made to perform substantially the same function in a way mechanically equivalent.

D is the horizontal gripper-bar, which slides on bearings secured to the side of the frame A. Motion back and forth is given to bar D by the cam-lever E. One end of the cam-lever is secured by a stud to the bar D. The other end has a stud, $a$, having a roller, $b$, which plays in the groove $c$ of the cam G.

H is the main shaft, which actuates the cam G, and also the driving mechanism.

I is the outer gripper or jaw, having a curved foot, and is intended while in use to rest upon the outer surface of the inner sole, close up to and projecting under the upper.

This gripper I slides upon bar D, and is actuated toward the other gripper by the spiral spring e. The force of this spring is regulated by means of the set-screw f and stud j. The motion inward of gripper I is regulated by screw k against stop l.

J is the other gripper-jaw, which is fast to bar D by means of a set-screw. (See Figs. 5 and 6.) Near the inner edge of the gripper J is a vertical passage, i, for the tack and the driver.

g is a spring operating in the lower part of passage i, to hold the tack in position and ready for the blow of the driver.

K is the driver, which plays vertically in the hollow standard L upon top of the frame A. A strong spiral spring is contained in standard L, resting upon the head K' of the driver K, and held down by the hand-screw M. The downward pressure of this spring upon the driver when raised by the cam N gives the blow which drives the tack. Cam N is driven by main shaft H, which is operated by appropriate pulleys and belts, or by gearing.

P is the chute, through which the tacks are fed singly, either by a small boy or by a suitable automatic tack-feeder. As the tack leaves chute P it is fed into the tack-passage i in gripper J, and falls point downward until it rests upon or just above the upper, where it is held by the spring g (see Fig. 6) until the driver K strikes it and carries it away from the said spring, driving it through the upper and into the inner sole.

An automatic tack-feeder is shown in Figs. 9, 10, and 11.

Q is the tack-hopper, which has two grooves, q, crossing each other at right angles in the bottom. These grooves are wide enough and deep enough to receive the body of the tack point downward and exclude the head, as shown in Fig. 10. The hopper Q receives a quarter-turn by means of rack and pawl connected to cam-lever E at each forward stroke of the cam-lever. This quarter-turn shakes up the tacks and causes them to drop into the grooves q. Whenever the grooves q get into line with grooves q' of the raceway R, the tacks t slide down the groove q' to its mouth, where the last tack is held by the spring u.

S is a bell-crank, having a pivot in bar D and another pivot in bearing v on side of frame A. s is a bent spring on outer end of crank S. When crank S, by movement of arm D, is swung around, (see dotted line in Fig. 10,) spring s seizes the tack, snatches it from mouth of raceway R, and carries it back through V-shaped slot o in side of chute P, where it is dropped. Thence it slides down into the tack-passage i in the gripper J.

In operating my laster the workman stands facing the side of the machine shown in Fig. 1. Taking a last, he applies the insole, and applies also the upper, which is bent over at the toe, and drives the center toe-tack either by hand, as usual, or by the machine. The last is then so held that gripper I rests on the insole snug up to and under the edge of the upper. At this instant the operator lifts up the last, so as to force the insole against the holdfast B. Motion being given to the mechanism, gripper J moves up to gripper I, firmly grasping the edge of the upper. As gripper J moves still further it is resisted by the holdfast B, so that the upper is forcibly pulled over the insole and last, and is held in position until the tack-passage in gripper J is in line with the gripper. At that instant the driver descends and drives the tack, as shown in Fig. 6. The operator then, keeping time with the machine, moves his last a proper distance for the next tack, and repeats the operation above described until the shoe is wholly tacked around or lasted.

By my machine I can use much shorter tacks than those needed by a hand-laster.

It will be readily seen that the finger or holdfast B, or its equivalent, may be used in various ways in the operation of lasting a boot or shoe. It may be used to feed the work through the grippers, and at the same time hold the work against the pull of the grippers. It may be made in various shapes. The spur-wheel form may be used; or one gripper may be fixed to the machine, while the holdfast could be fixed to a gripper-bar with the other jaw, with a spring between the jaw and the holdfast that would keep the grippers closed; then as the gripper-bar moved in, the spear or holdfast would move the work forward, while the upper would be held between the grippers, and in this way bring the upper down over the last and hold it until the tack is driven. The holdfast may also be made with a joint, to release itself as the shoe is fed along by the operator. The holdfast may be made to pass through a sleeve to rest upon the inner sole, so as to serve as a stop or regulator to prevent the holdfast from entering too deep into the insole. The gripper-bar may have an adjustment, so as to lengthen or shorten the stroke of the grippers. This can be done so as not to increase the forward movement of the gripper-bar; otherwise it would throw the gripper containing the tack-passage out of line with the driver. This would make it needful to adjust the gripper-bar every time the stroke was increased or decreased. This may be obviated by an inclined slot in the gripper-bar. This does not increase the forward throw, but does increase the backward stroke of the operating-lever. There are other obvious means of varying the holdfast, the gripper action, and other parts of my invention. I prefer those described.

What I claim is—

1. The holdfast B, with one or more points adapted to penetrate the sole, in combination with suitable mechanism for pulling over the upper, substantially as and for the purposes set forth.

2. The mechanism for gripping and pulling over the upper, composed of the jaws I and J, gripper-bar D, and lever E, adapted to give horizontal motion to the gripper-jaws, whereby the upper is forced over and upon the insole, while the shoe is held in a fixed position by a holdfast, substantially as and for the purposes set forth.

3. The mechanism for predetermining the force to be employed upon the upper, consisting of jaws I and J, bar D, and lever E, having jaw I, actuated toward jaw J by means of spring $e$ and tension-screw $f$, substantially as and for the purposes set forth.

4. In a lasting-machine provided with a pair of gripper-jaws, the longitudinally-sliding bar D, supporting the jaws, one of which (jaw I) is adapted to slide upon the bar, and the other (jaw J) to slide with the bar, all so arranged that when the jaws grip the upper they shall simultaneously move forward, substantially as and for the purposes set forth.

5. The gripper-jaw J, having tack-passage $i$ and spring $g$, substantially as and for the purposes set forth.

6. The automatic tack-hopper Q, operated by cam-lever E, substantially as set forth.

7. The tack-feeding mechanism composed of tack-hopper Q, with grooves $q$, raceway R, with groove $q'$, crank S, spring $s$, V-shaped slot $o$, and chute P, operating substantially as and for the purposes set forth.

January 3, 1883.

JACOB R. SCOTT.

Witnesses:
 J. C. CLAYTON,
 JAS. CAVANAGH.